United States Patent
Tada et al.

(10) Patent No.: US 7,767,182 B2
(45) Date of Patent: Aug. 3, 2010

(54) METHOD FOR PRODUCING FUNCTIONAL NANOCARBON AND HYDROGEN BY DIRECT DECOMPOSITION OF LOWER HYDROCARBON

(75) Inventors: Akio Tada, Kitami (JP); Satoru Nakamura, Muroran (JP); Hideaki Ito, Muroran (JP); Yoshitaka Togo, Minato-ku (JP); Kikuo Koseki, Chofu (JP); Hiroyuki Takasuna, Minato-ku (JP)

(73) Assignees: The Japan Steel Works, Ltd., Tokyo (JP); National University Corporation Kitami Institute of Technology, Hokkaido (JP); Kajima Corporation, Tokyo (JP)

( * ) Notice: Subject to any disclaimer, the term of this patent is extended or adjusted under 35 U.S.C. 154(b) by 925 days.

(21) Appl. No.: 11/391,213

(22) Filed: Mar. 29, 2006

(65) Prior Publication Data

US 2006/0257310 A1    Nov. 16, 2006

(30) Foreign Application Priority Data

May 11, 2005   (JP)   ............................ P2005-138675

(51) Int. Cl.
*C01B 31/00*    (2006.01)
*C01B 3/26*    (2006.01)
*C01B 3/38*    (2006.01)

(52) U.S. Cl. .................. 423/445 R; 423/652; 423/653; 423/654; 977/891

(58) Field of Classification Search .............. 423/447.2, 423/447.3, 445 B, 447.7, 650, 445 R, 447.1, 423/644, 651, 652, 653, 654; 977/734, 735, 977/737, 742, 745, 842, 843, 844, 847, 891
See application file for complete search history.

(56) References Cited

U.S. PATENT DOCUMENTS 4,681,612 A * 7/1987 O'Brien et al. ............... 62/624

(Continued)

FOREIGN PATENT DOCUMENTS

JP    10-182121 A    7/1998

(Continued)

OTHER PUBLICATIONS

Li et al., "Simultaneous Production of Hydrogen and Nanocarbon from Decomposition of Methane on a Nickel-Based Catalyst," 2000, Energy & Fuel, 14, pp. 1188-1194.*

(Continued)

*Primary Examiner*—Wayne Langel
*Assistant Examiner*—Brittany M Martinez
(74) *Attorney, Agent, or Firm*—Sughrue Mion, PLLC (57) ABSTRACT

In a reaction where a lower hydrocarbon is subjected to direct decomposition by using a catalyst to produce a functional nanocarbon and hydrogen, the lower hydrocarbon is subjected to the reaction in an coexistent gas comprising low concentration of oxidizing gas, reducing gas or a mixture thereof. The precursor of functional nanocarbon produced on the catalyst and amorphous carbon secondarily produced on the catalyst react with the coexistent gas so that being removed from the catalyst, making it possible to prevent the drop of conversion with time on stream due to the inhibition of the reaction by the precursor and by-product. In the case where the raw material of lower hydrocarbon is biogas, the coexistent gas can be easily contained in methane by lowering purification degree of methane.

11 Claims, 4 Drawing Sheets

U.S. PATENT DOCUMENTS

| | | | |
|---|---|---|---|
| 6,875,417 B1* | 4/2005 | Shah et al. | 423/650 |
| 7,022,541 B1* | 4/2006 | Yenilmez et al. | 438/52 |
| 2005/0074392 A1* | 4/2005 | Yang et al. | 423/447.3 |
| 2006/0245996 A1* | 11/2006 | Xie et al. | 423/445 R |
| 2007/0253889 A1* | 11/2007 | Awano et al. | 423/447.3 |

FOREIGN PATENT DOCUMENTS

| | | | |
|---|---|---|---|
| JP | 2004-269398 | * | 9/2004 |
| JP | 2004-269398 A | | 9/2004 |
| WO | WO 2005/052229 A2 | * | 6/2005 |

OTHER PUBLICATIONS

Zabidi et al., "Hydrogen Production by Catalytic Decomposition of Methane," 2003, Platform, vol. 3, No. 2, pp. 3-9.*

* cited by examiner

FIG. 7

METHOD FOR PRODUCING FUNCTIONAL NANOCARBON AND HYDROGEN BY DIRECT DECOMPOSITION OF LOWER HYDROCARBON This application is based on Japanese Patent Application No. 2005-138675, which is incorporated herein by reference.

BACKGROUND OF THE INVENTION

1. Field of the Invention

The present invention relates to a method for producing a functional nanocarbon and hydrogen by direct decomposition of a lower hydrocarbon such as methane in the presence of a catalyst.

2. Description of the Related Art

It has heretofore been known that a reaction in the presence of a catalyst causes the production of carbon (see, e.g., JP-A-10-182121). JP-A-10-182121 proposes that the reaction of carbon dioxide with hydrogen causes the production of carbon. Further, a method has been recently proposed which comprises subjecting a lower hydrocarbon containing methane to direct decomposition in the presence of a catalyst to produce a functional nanocarbon and hydrogen. Moreover, JP-A-2004-269398 proposes a process for the production of hydrogen and an aromatic hydrocarbon from a lower hydrocarbon wherein hydrogen is incorporated in the raw material of hydrocarbon in an amount of 20 vol % or less so that carbon deposited in the pores of zeolite or on the surface of zeolite is converted back to methane which is then removed.

In order to enhance the percent one pass conversion in the above related arts, it is necessary that the reaction temperature be raised as much as possible because the direct decomposition reaction of a lower hydrocarbon into carbon and hydrogen is endothermic. However, when the reaction temperature is raised, the decomposition reaction rate of the lower hydrocarbon is raised, causing the production of a large amount of various solid carbon materials on the surface of the catalyst. These solid carbon materials include functional nanocarbon materials which are desired products (e.g., carbon nanofiber, carbon nanotube, onion-like carbon), precursor of carbon nanofiber, and secondarily produced amorphous carbon. The turbostratic carbon constituting carbon nanofiber or onion-like carbon can be definitely distinguished from amorphous carbon by X-ray diffractometry or Raman spectroscopy. When the functional nanocarbon precursor or amorphous carbon occurs on the surface of the catalyst in excess amount, they react with the catalyst metal to produce an inactive metal carbide or physically cover the active sites on the catalyst, preventing the access and adsorption of the lower hydrocarbon to the catalytic active sites and the elimination and diffusion of hydrogen, which is a gaseous product, and hence deteriorating the rate of decomposition reaction of the lower hydrocarbon to functional nanocarbon and hydrogen. As a result, conversion (percent conversion) of the lower hydrocarbon decreases with time, reducing the time interval between catalyst replacements to disadvantage. The direct decomposition reaction of a lower hydrocarbon is greatly different from ordinary gas-solid catalytic reaction in that one of the products is a solid carbon material that remains on the surface of the catalyst. Therefore, it has been heretofore considered that the drop of the conversion of lower hydrocarbon with time is unavoidable.

In the method for producing a functional nanocarbon and hydrogen by direct decomposition of a lower hydrocarbon in the presence of a catalyst, it has been heretofore practiced to use as a raw material a high purity lower hydrocarbon which has been freed of components inhibiting the action of the catalyst as much as possible. Therefore, an apparatus for purifying the lower hydrocarbon is needed. The fixed cost and operating cost required for this purifying apparatus add to the production cost. For example, when methane obtained by the purification of a biogas is used as lower hydrocarbon, carbon dioxide that accounts for the biogas in a proportion of from 30% to 35% must be separated. In a hollow fiber membrane separating method, carbon dioxide normally remains in methane in a proportion of about several percents. In order to further purify the biogas, so-called PSA method must be employed, raising an economical problem that the burden of fixed cost and operating cost occurs separately.

SUMMARY OF THE INVENTION

The invention has been worked out to solve the aforementioned problems with the related art technique. An object of the invention is to provide a method for producing a functional nanocarbon and hydrogen from a lower hydrocarbon which comprises selectively reacting excess precursor carbon of functional nanocarbon produced by direct decomposition reaction of a lower hydrocarbon and an amorphous carbon secondarily produced by the reaction with a low concentration of oxidizing gas, reducing gas or a mixture thereof (carbon dioxide, oxygen, water and hydrogen are exemplified) so that they are gasified and removed to produce only the desired product without delay and the reduction of conversion of lower hydrocarbon with time can be minimized.

Another object of the invention is to develop a lower hydrocarbon direct decomposition catalyst that allows the mixing of a lower hydrocarbon with a low concentration of oxidizing gas, reducing gas or a mixture thereof (carbon dioxide, oxygen, water and hydrogen are exemplified) and provide a method for producing a functional nanocarbon and hydrogen from a lower hydrocarbon which comprises optimizing the working conditions of the catalyst, making it possible to reduce the purification cost of lower hydrocarbon.

That is, according to a first aspect of the invention, there is provided a method for producing a functional nanocarbon and hydrogen comprising direct decomposing a lower hydrocarbon by using a catalyst with subjecting coexistent gas to the lower hydrocarbon, the coexistent gas comprising low concentration of oxidizing gas, reducing gas or a mixture thereof.

According to a second aspect of the invention, the coexistent gas reacts with excess precursor of a functional nanocarbon produced on the catalyst or an amorphous carbon secondarily produced on the catalyst and removes the excess precursor of the functional nanocarbon and the amorphous carbon from the catalyst.

According to a third aspect of the invention, the coexistent gas comprises hydrogen in a volume of from 0.05% to 5.0%, carbon dioxide in a volume of from 0.05% to 10%, water in a volume of from 0.05% to 5.0% or a mixture thereof.

According to a fourth aspect of the invention, the lower hydrocarbon comprises methane.

According to a fifth aspect of the invention, the lower hydrocarbon comprises methane in biogas.

According to a sixth aspect of the invention, the coexistent gas comprises carbon dioxide in biogas.

According to a seventh aspect of the invention, the coexistent gas comprises water in biogas.

According to an eighth aspect of the invention, the coexistent gas comprises hydrogen produced by the direct decomposing the lower hydrocarbon.

According to a ninth aspect of the invention, the catalyst comprises only nickel and iron or further comprises another metal comprising at least one of palladium and cobalt.

According to a tenth aspect of the invention, the direct decomposing the lower hydrocarbon is carried out in a temperature of from 650° C. to 850° C. and a pressure of 1.0 MPa or less.

As mentioned above, the method for producing a functional nanocarbon and hydrogen from a lower hydrocarbon of the invention involves a reaction by which a lower hydrocarbon is subjected to direct decomposition in the presence of a catalyst to obtain a functional nanocarbon and hydrogen, wherein the lower hydrocarbon is subjected to the reaction in the presence of a low concentration of oxidizing gas, reducing gas or a mixture thereof (coexistent gas). In this manner, the precursor of functional nanocarbon produced on the catalyst by the reaction and amorphous carbon secondarily produced on the catalyst by the reaction react with the coexistent gas so that they are effectively removed from the catalyst, making it possible to prevent the reduction of conversion with time due to the inhibition of the reaction by the precursor and by-product. Further, by prolonging the interval of time between catalyst replacements as much as possible, the production efficiency can be enhanced. Moreover, since the mixing of the low concentration of oxidizing gas, reducing gas or the mixture thereof with the lower hydrocarbon is allowed, the purification cost of the lower hydrocarbon can be reduced by optimizing the working conditions. In the case where the raw material of lower hydrocarbon is a biogas, the coexistent gas is originally contained in the raw material. Therefore, the coexistent gas can be easily contained in methane by lowering the degree of purification of methane. Further, since hydrogen can be obtained as one of products of decomposition of the lower hydrocarbon and can be easily mixed with the unreacted lower hydrocarbon which is returned to the inlet side of the unreacted lower hydrocarbon reactor where it is then again reacted, there can be exerted secondary effects of reducing the cost of purifying the raw material and reducing the cost of separating and purifying hydrogen during the return of unreacted methane from the outlet of the reactor to the inlet of the reactor.

DETAILED DESCRIPTION OF THE PREFERRED EMBODIMENTS

In accordance with the invention, the action of a catalyst causes a lower hydrocarbon to be directly decomposed to produce nanocarbon and hydrogen. The direct decomposition of the lower hydrocarbon is accompanied by the production and accumulation of excess precursor carbon of functional nanocarbon and amorphous carbon on the surface of the catalyst. This causes the covering of active sites on the catalyst, making it possible to prevent the access and adsorption of the lower hydrocarbon to the active sites or the elimination and diffusion of hydrogen, which is a gaseous product. In the invention, however, the coexistent gas (carbon dioxide, water, hydrogen) reacts with the unnecessary solid carbon, i.e., excess precursor of nanocarbon and secondarily produced amorphous carbon at the reaction temperature where the lower hydrocarbon undergoes direct decomposition reaction to produce carbon monoxide, a mixture of carbon monoxide and hydrogen and methane, respectively, thereby gasifying the solid carbon that prevents the reaction. In this manner, a good reaction state can be maintained.

However, when the concentration of the oxidizing gas, reducing gas or the mixture thereof is sufficiently high, the majority of the solid carbon containing nanocarbon produced from the lower hydrocarbon is gasified away. Therefore, in order to expect the effect of selective reaction with the precursor carbon of functional nanocarbon or amorphous carbon, the coexistent gas must occur in a low concentration.

The optimum range of concentration of the oxidizing gas or reducing gas depends on the kind of the catalyst metal, the kind of the carrier, the percent loading of the catalyst metal on the carrier, whether or not the carrier is used, the amount and shape of the catalyst used, the reaction temperature, the flow rate of reaction gas, whether or not the catalyst is reduced with hydrogen, etc. It also depends on how the oxidizing gas or reducing gas is coexistent.

It was also confirmed that the lower the crystallinity of the solid carbon is, the higher is the reactivity of the solid carbon with the low concentration of oxidizing gas, reducing gas or the mixture thereof (carbon dioxide, oxygen, water and hydrogen are exemplified), demonstrating that the excess precursor carbon of functional nanocarbon and amorphous carbon are gasified away before the functional nanocarbon composed of turbostratic carbon. This is the basis for the belief that the oxidizing gas or reducing gas or the mixture thereof reacts selectively with the amorphous carbon.

As the lower hydrocarbon to be used herein there is typically used methane. However, the invention is not limited to methane. Ethane, propane, butane, ethylene, propylene, butylene, etc. may be used. The lower hydrocarbon may be obtained by chemical synthesis or from a biogas. The origin of the lower hydrocarbon is not specifically limited.

As the coexistent gas there may be exemplified carbon dioxide, oxygen, water or hydrogen. The coexistent gas may be always or intermittently coexistent with the lower hydrocarbon. The coexistent gas may be prepared separately of the lower hydrocarbon, may be derived when the lower hydrocarbon is obtained or may be produced accompanying the aforementioned reaction. In other words, in the case where a lower hydrocarbon in a biogas is used, carbon dioxide or water in the biogas may be used. Alternatively, hydrogen produced by the decomposition of a lower hydrocarbon may be used as the coexistent gas. In this case, the hydrogen gas discharged from the reactor may be returned to the inlet side of the reactor singly or with the unreacted lower hydrocarbon discharged from the reaction vessel so that it is again reacted.

As the catalyst to be used in the reaction of the invention there is preferably used one comprising only nickel and iron or such a catalyst further comprising palladium or cobalt as another metal. In the presence of such a catalyst, nanocarbon and hydrogen can be efficiently produced from a lower hydrocarbon. The catalyst is preferably reduced with hydrogen before use.

The reaction in the presence of the aforementioned catalyst is preferably effected at a temperature of from 650° C. to 850° C. and a pressure of 1.0 MPa or less. In this manner, it is assured that nanocarbon can be produced even in the presence of the coexistent gas.

In the case where as the low concentration coexistent gas there is used carbon dioxide or hydrogen on the assumption that the aforementioned catalyst is used, hydrogen and carbon dioxide are preferably coexistent with the lower hydrocarbon in a proportion of from 0.05 to 5.0 vol % and from 0.05 to 10 vol %, respectively. When the amount of the coexistent gas is insufficient, the aforementioned precursor cannot be sufficiently removed. On the contrary, when the amount of the coexistent gas is too great, nanocarbon is reacted away. From this standpoint of view, the aforementioned range is predetermined. For the same reasons, the proportion of hydrogen and carbon dioxide are more preferably from 1.0 to 3.0 vol % and from 2.5 to 7.5 vol %, respectively.

In the case where there is used a catalyst comprising only nickel or a catalyst comprising nickel and palladium or cobalt as another metal, the preferable amount of carbon dioxide, if used as coexistent gas, is from 2.5 to 7.5 vol % and the preferable amount of hydrogen, if used as coexistent gas, is from 1.0 to 3.0 vol %.

In the case where there is used a catalyst comprising only iron or a catalyst comprising iron and palladium or cobalt as another metal, the preferable amount of carbon dioxide, if used as coexistent gas, is from 0.05 to 2.0 vol % and the preferable amount of hydrogen, if used as coexistent gas, is from 1.0 to 3.0 vol %.

An embodiment of implementation of the invention will be described in connection with FIG. 1.

Figure 1:
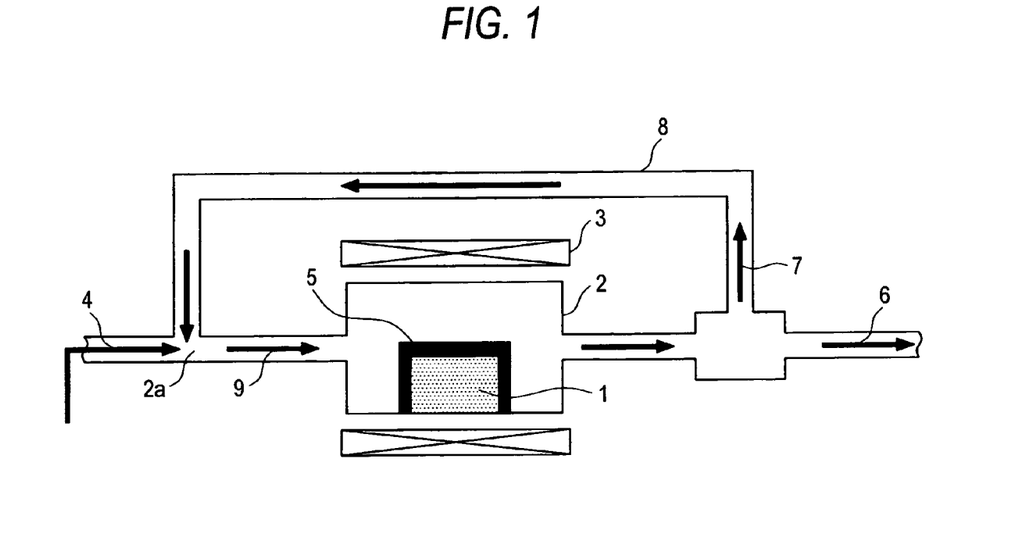
FIG. 1 is a conceptional diagram illustrating a reactor for use in the production method according to an embodiment of implementation of the invention.

FIG. 1 is a conceptional diagram illustrating an apparatus for directly decomposing a lower hydrocarbon into hydrogen and nanocarbon material in the presence of a catalyst. A catalyst 1 comprising only nickel and iron and optionally palladium or cobalt as another metal is placed in a reactor 2 which is heated to a predetermined temperature by a heater 3. A lower hydrocarbon 4 in a gaseous form is fed to the reactor 2 at one end thereof. In the reactor 2, the lower hydrocarbon 4 is then decomposed into carbon 5 and hydrogen 6 by the action of the catalyst 1. The carbon 5 remains in the catalyst 1 while the hydrogen 6 and the unreacted lower hydrocarbon 7 are discharged from the reactor 2 at the other end thereof. The unreacted lower hydrocarbon 7 is separated from the hydrogen 6, and then returned to the inlet 2a of the reactor through a return pipe 8. A low concentration of oxidizing gas, reducing gas or a mixture thereof (coexistent gas) 9 is fed to the reactor 2 in admixture with the lower hydrocarbon 4. For example, by taking a part of the hydrogen 6 into the unreacted lower hydrocarbon 7 which is then fed to the inlet 2a of the reactor, the coexistent gas is allowed to exist in the lower hydrocarbon. Alternatively, a coexistent gas which has been otherwise prepared may be introduced into the inlet 2a of the reactor where it is then mixed with the lower hydrocarbon.

In the aforementioned apparatus, the interior of the reactor 2 is heated to a temperature of preferably from 600° C. to 850° C. by the heater 3. The gas to be introduced into the reactor 2 contains a lower hydrocarbon which has been returned through the return pipe 8 and a coexistent gas such as carbon dioxide and hydrogen in a proper concentration besides the lower hydrocarbon 4. When these gases are introduced into the reactor 2, the action of the catalyst 1 causes the lower hydrocarbon to produce hydrogen 6 and carbon 5. The carbon 5 remains on the catalyst 1 while the hydrogen 6 is discharged from the reactor 2 with the unreacted lower hydrocarbon 7. The carbon 5 contains excess nanocarbon precursor and secondarily produced amorphous carbon besides nanocarbon. The excess precursor and by-product react with a coexistent gas in preference to nanocarbon so that they are removed away from the catalyst 1, making it possible to maintain a good reactivity on the catalyst 1.

While FIG. 1 depicts an ordinary pressure fixed bed flow type apparatus comprising a reactor disposed horizontally therein, the disposition of the reactor is not limited to horizontal and the gas pressure in the reactor is not limited to ordinary value.

The working type of the catalyst is not limited to fixed bed and may be a moving bed or fluidized bed.

While the catalyst is normally composed of a carrier and the aforementioned catalyst metal, an unsupported catalyst free of carrier may be used in the invention.

Embodiments

COMPARATIVE EXAMPLE

Figure 2:
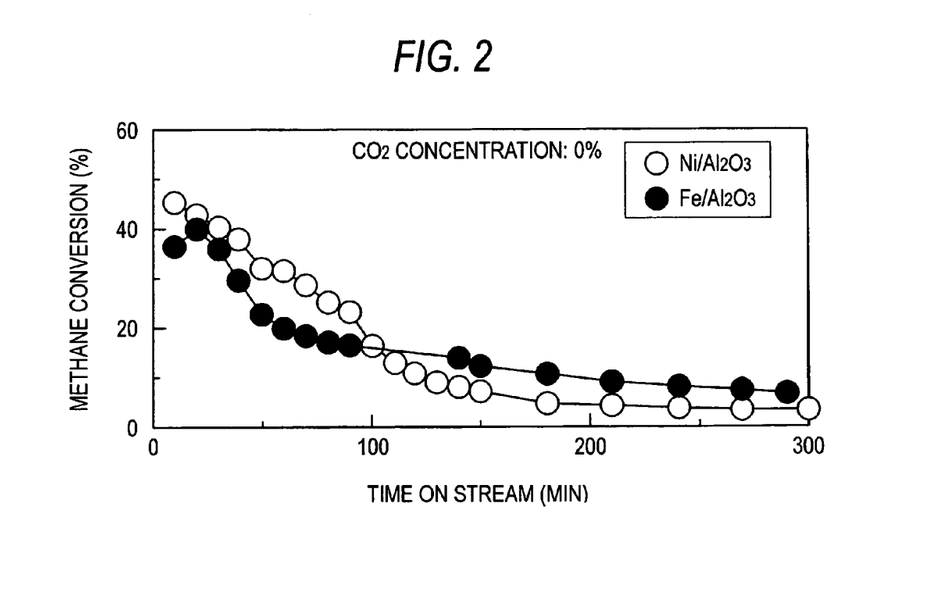
FIG. 2 is a graph illustrating the change of conversion with time on stream developed when the reaction is effected in the presence of a catalyst comprising iron alone in the absence of coexistent gas.

Using a reactor shown in FIG. 1, a methane decomposition reaction was effected at a $CO_2$ concentration of 0%, a reaction temperature of 700° C., a catalyst weight of 0.5 g and a methane flow rate of 100 ml/min. The results are shown in FIG. 2.

A Ni (10 wt %)/$Al_2O_3$ catalyst and an Fe (11 wt %)/$Al_2O_3$ catalyst were prepared by impregnating alumina ($Al_2O_3$) with an aqueous solution of the respective metal nitrate. The figure in the parenthesis in the formula of the catalysts each indicate the weight percentage of the metals. As can be seen in FIG. 2, both Ni (10 wt %)/$Al_2O_3$ catalyst and Fe (11 wt %)/$Al_2O_3$ catalyst cause the drop of methane conversion with time on stream. Ni (10 wt %)/$Al_2O_3$ catalyst showed a higher methane conversion than Fe (11 wt %)/$Al_2O_3$ catalyst up to 100 minutes. However, the superiority of methane conversion was inverted thereafter.

In general, the methane conversion is affected by the kind of the catalyst used, the reaction temperature, the methane flow rate, etc. Referring to these factors, when the reaction temperature was 700° C. or more, Fe/$Al_2O_3$ catalyst caused the rise of methane conversion while Ni/$Al_2O_3$ catalyst caused the drop of methane conversion. Thus, the superiority of methane conversion was fully inverted from the aforementioned case. However, when the reaction temperature was lower than 700° C., Fe/$Al_2O_3$ catalyst caused the drop of methane conversion while Ni/$Al_2O_3$ catalyst caused the rise of methane conversion. The difference in methane conversion between the two catalysts increased more and more. The reaction temperature at which the methane conversion was almost zero was about 600° C. for Fe/$Al_2O_3$ catalyst and about 450° C. for Ni/$Al_2O_3$ catalyst.

The weight of carbon produced was measured after the termination of the methane decomposition reaction. From the measurements were then calculated the ratio (C/M) of number of carbon atoms per atom of catalyst metal for Ni/$Al_2O_3$ catalyst and Fe/Al$_2$O$_3$ catalyst. As a result, there occurred some cases where C/M of Ni/Al$_2$O$_3$ catalyst is about 50 times that of Fe/Al$_2$O$_3$ catalyst.

As can be seen in the lower limit of reaction temperature and higher C/M, an Ni/Al$_2$O$_3$ catalyst exhibits a much higher methane decomposition activity than an Fe/Al$_2$O$_3$ catalyst. Accordingly, the reason why Ni/Al$_2$O$_3$ catalyst exhibits a lower methane conversion than Fe/Al$_2$O$_3$ catalyst after 100 minutes in FIG. 2 is presumably that the precursor of functional nanocarbon or amorphous carbon remains excessively mainly on the surface of the catalyst to produce inactive metal carbides or physically cover the active sites on the catalyst, making it possible to prevent the access and adsorption of the lower hydrocarbon to the catalytic active sites and the elimination and diffusion of hydrogen, which is a gaseous product. In other words, as the catalyst there is preferably used one comprising nickel alone or one comprising nickel and palladium or cobalt as another metal.

Example 1

Figure 3:
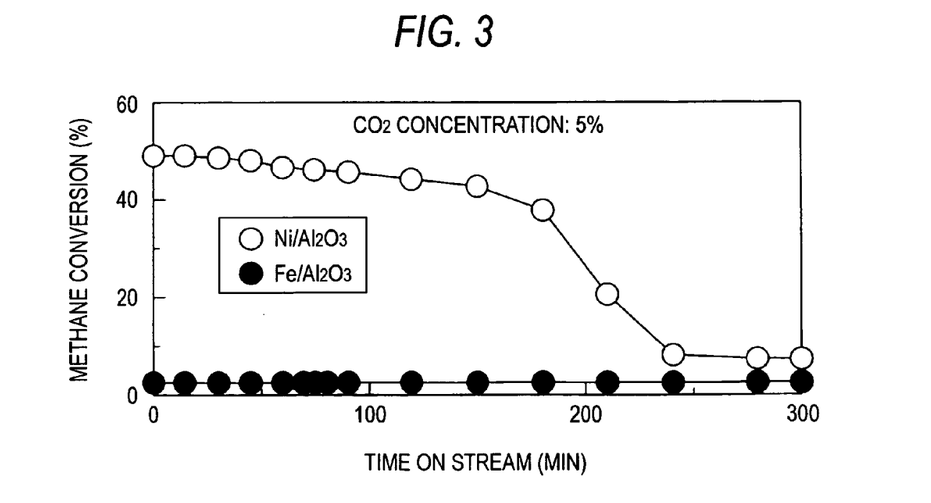
FIG. 3 is a graph illustrating the change of conversion with time on stream developed when the reaction is effected in the presence of an iron catalyst or a nickel catalyst and 5% $CO_2$.

Using a reactor shown in FIG. 1, a methane decomposition reaction was effected at a reaction temperature of 700° C., a catalyst weight of 0.5 g and a methane flow rate of 100 ml/min. The CO$_2$ concentration was kept at 5% throughout the reaction. The results are shown in FIG. 3. As can be seen in FIG. 3, the Fe (11 wt %)/Al$_2$O$_3$ catalyst caused remarkable inhibition of reaction as compared with the case of FIG. 2 where the CO$_2$ concentration is 0%. On the contrary, the Ni (10 wt %)/Al$_2$O$_3$ catalyst caused definite enhancement of methane conversion up to 150 minutes. Although the experiments were made at the same CO$_2$ concentration, the effect of coexistent gas was exerted in opposite manners. This demonstrates that the optimum value of concentration of CO$_2$ to be coexistent differs with the kind of the catalyst metal.

If one of the reasons why Ni/Al$_2$O$_3$ catalyst exhibits a lower methane conversion than Fe/Al$_2$O$_3$ catalyst after 100 minutes in FIG. 2 is the reduction of specific surface area by agglomeration of Ni metal particles (sintering), the results of FIG. 3 suggest that when the CO$_2$ concentration is 5%, there is concurrently exerted an effect of preventing sintering of Ni metal particles.

Example 2

Figure 4:
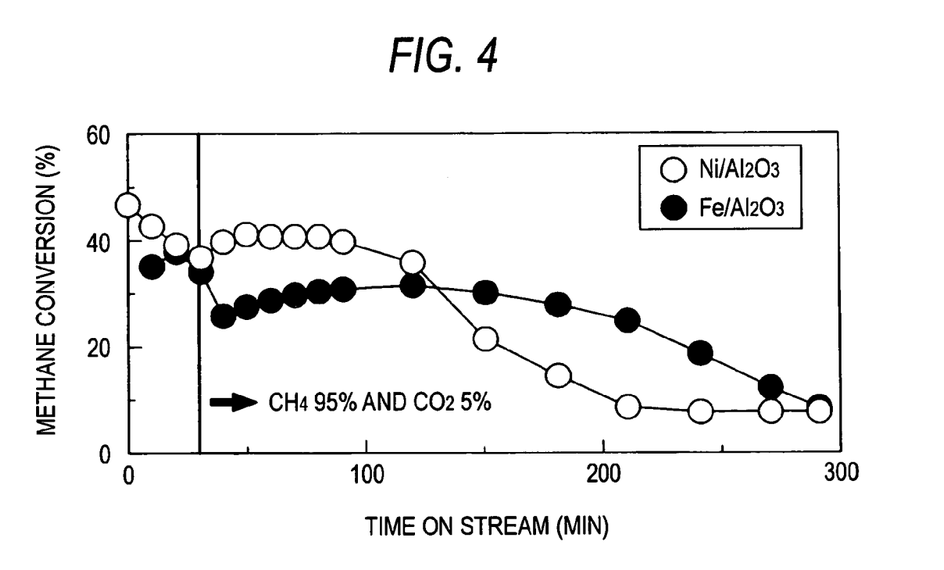
FIG. 4 is a graph illustrating the change of conversion with time on stream developed when the reaction is effected in the presence of an iron catalyst or a nickel catalyst with 5% $CO_2$ being present as a coexistent gas from the middle point in the procedure of the reaction.

Using a reactor shown in FIG. 1, a methane decomposition reaction was effected at a reaction temperature of 700° C., a catalyst weight of 0.5 g and a methane flow rate of 100 ml/min. In the course of the reaction, the concentration of CO$_2$ was changed to 5%. The results are shown in FIG. 4.

The results thus obtained were quite different from that obtained in the case where the concentration of CO$_2$ was kept at 5% throughout the reaction. When the Fe (11 wt %)/Al$_2$O$_3$ catalyst was used, the methane conversion was able to be kept on the order of 30% over an extended period of time. Taking into account the fact that when CO$_2$ was coexistent in a proportion of 5% from the first beginning, the methane conversion was about 3%, this difference is worth noticing.

It is thought that when CH$_4$ comes in contact with Fe particles in the Fe/Al$_2$O$_3$ catalyst, a surface chemical species CH$_x$ obtained by removing H in a number of x from CH$_4$ is produced with the production of hydrogen molecule H$_2$ followed by some steps through which CH$_x$ species is converted to functional nanocarbon and amorphous carbon. On the other hand, it is thought that when CO$_2$ is adsorbed to Fe particles before the contact of CH$_4$ with Fe particles, iron oxide is produced on the surface of Fe particles so that it develops to an iron oxide layer covering the surface of Fe particles. Once an iron oxide layer has been formed on Fe particles, Fe particles cannot be reproduced even if CH$_4$ comes in contact with the iron oxide layer later. When CO$_2$ approaches the site where CH$_4$ has previously come in contact to produce a large amount of surface chemical species CH$_x$, the procedure of reacting CO$_2$ with CH$_x$ to produce CO or H$_2$O can occur in preference to the procedure of producing iron oxide. Accordingly, in the case where a catalyst comprising iron alone and optionally palladium or cobalt as another metal is used, a method may be employed which comprises bringing a lower hydrocarbon into contact with the catalyst without bringing a coexistent gas into contact with the catalyst, and then allowing the coexistent gas to be coexistent with the lower hydrocarbon.

In the case where CH$_4$ and CO$_2$ are present, a competitive adsorption occurs. The molecule to be adsorbed preferentially is determined by the conditions such as adsorptivity of the two gases, partial pressure and temperature. It is thus thought that the concentration of CO$_2$ has an optimum value.

It is thought that the Ni/Al$_2$O$_3$ catalyst, too, causes phenomenon similar to that of Fe/Al$_2$O$_3$ catalyst. However, a big difference is that when CH$_4$ comes in contact with the nickel oxide layer, Ni particles can be relatively easily reproduced. This was confirmed by the reaction of nickel oxide with CH$_4$. Accordingly, in the case where CH$_4$ and CO$_2$ are present, the upper limit of CO$_2$ concentration in which CH$_x$ becomes a species to be preferentially adsorbed is higher than that of Fe/Al$_2$O$_3$ catalyst.

Example 3

Figure 5:
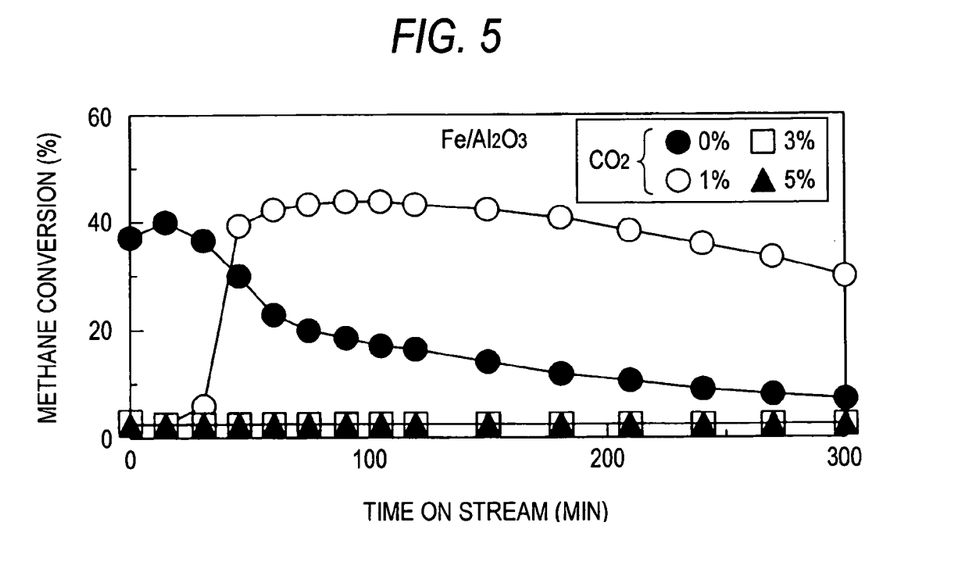
FIG. 5 is a graph illustrating the change of conversion with time on stream developed when the reaction is effected in the presence of an iron catalyst with $CO_2$ being present as a coexistent gas in different amounts.

Using a reactor shown in FIG. 1, a methane decomposition reaction was effected at a reaction temperature of 700° C., an Fe (11 wt %)/Al$_2$O$_3$ catalyst weight of 0.5 g and a methane flow rate of 100 ml. The concentration of CO$_2$ was kept at 1% or 3% from the beginning of the reaction. The results are shown in FIG. 5 with the results of the case where the concentration of CO$_2$ was 0% or 5%. When the concentration of CO$_2$ was 3%, the resulting methane conversion was on the order of several percents as in the case where the concentration of CO$_2$ was 5%, suggesting that the species to be preferentially adsorbed was CO$_2$. However, when the concentration of CO$_2$ was 1%, a drastic effect appeared. In other words, the methane conversion was remarkably enhanced and the percent reduction of methane conversion with time on stream was remarkably reduced as compared with the case where the concentration of CO$_2$ was 0%. This suggests that the species to be preferentially adsorbed is CH$_x$ and CO$_2$ reacts selectively with the precursor of functional nanocarbon and amorphous carbon on the surface of the catalyst to gasify them away, demonstrating that the amount of the precursor of functional nanocarbon and amorphous carbon on the surface of the catalyst had fallen with the tolerable range. The results of methane decomposition reaction in the case where the concentration of CO$_2$ is 1% are inferior to that of the case where the concentration of CO$_2$ is 0% in that it took about 50 minutes to initiate the decomposition of methane. However, this problem was solved by previously subjecting the Fe (11 wt %)/Al$_2$O$_3$ catalyst to reduction with hydrogen. This is because the previous reduction with hydrogen causes the production of Fe particles, which are active species of methane decomposition reaction, eliminating the necessity of reducing and activating the Fe (11 wt %)/Al$_2$O$_3$ catalyst with methane after the initiation of methane decomposition reaction.

Example 4

Figure 6:
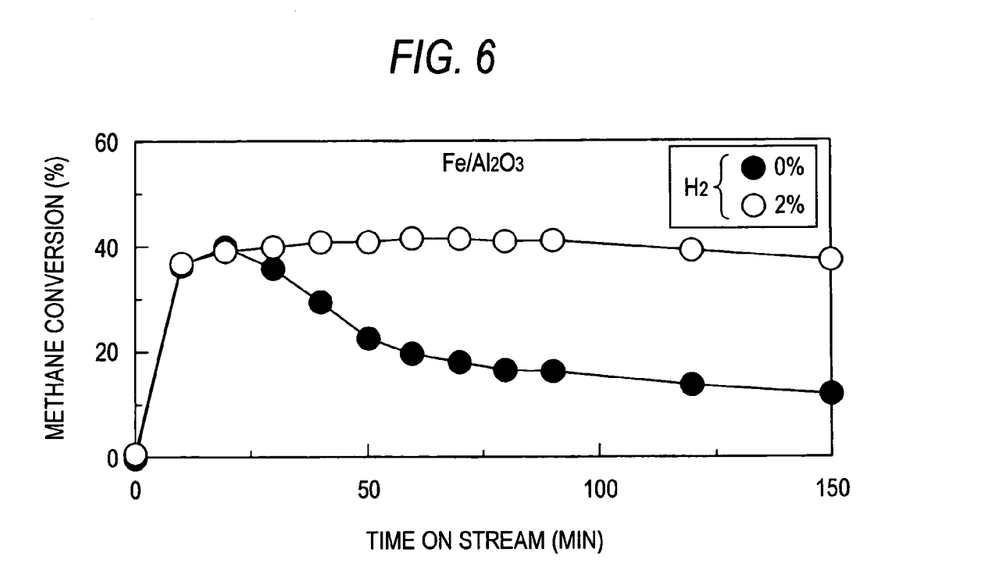
FIG. 6 is a graph illustrating the change of conversion with time on stream developed when the reaction is effected in the presence of an iron catalyst with no or 2% of $H_2$ being present as a coexistent gas.

Using a reactor shown in FIG. 1, a methane decomposition reaction was effected at a reaction temperature of 700° C., an Fe (10 wt %)/Al$_2$O$_3$ catalyst weight of 0.5 g and a methane flow rate of 100 ml/min. The concentration of H$_2$ was kept at 2% from the beginning of the reaction. The results are shown in FIG. 6. The maintenance of methane conversion was remarkably enhanced as compared with the case where the concentration of $H_2$ was 0%. This is presumably attributed to the fact that the excess precursor of functional nanocarbon and amorphous carbon on the surface of the catalyst react selectively with hydrogen so that they are gasified away.

In general, in the case where an iron catalyst supported on an inorganic carrier is used in methane decomposition reaction without undergoing hydrogen reduction, when methane contains hydrogen, positive effects of (1) reducing the time required until methane decomposition activity is developed and (2) enhancing methane conversion are exerted. On the contrary, it was found that when the hydrogen concentration exceeds 30%, negative effects of (1) lowering methane conversion and (2) remarkably raising the drop of methane conversion with time on stream are exerted. The positive effects are attributed to the reduction and activation of the Fe (10 wt %)/$Al_2O_3$ catalyst with methane after the initiation of methane decomposition reaction. On the other hand, the enhancement of methane conversion in the case where the hydrogen concentration is 10% or 20% is also attributed to the dilution of methane with hydrogen. In fact, when methane was diluted with argon to the same concentration, the methane conversion was enhanced. However, since the concentration of hydrogen was 2% in FIG. 6, the diluting effect can be neglected. Accordingly, the effect exerted by the coexistence of hydrogen in FIG. 6 is presumably attributed to the fact that the excess precursor of functional nanocarbon and amorphous carbon on the surface of the catalyst react selectively with hydrogen so that they are gasified away.

Example 5

Figure 7:
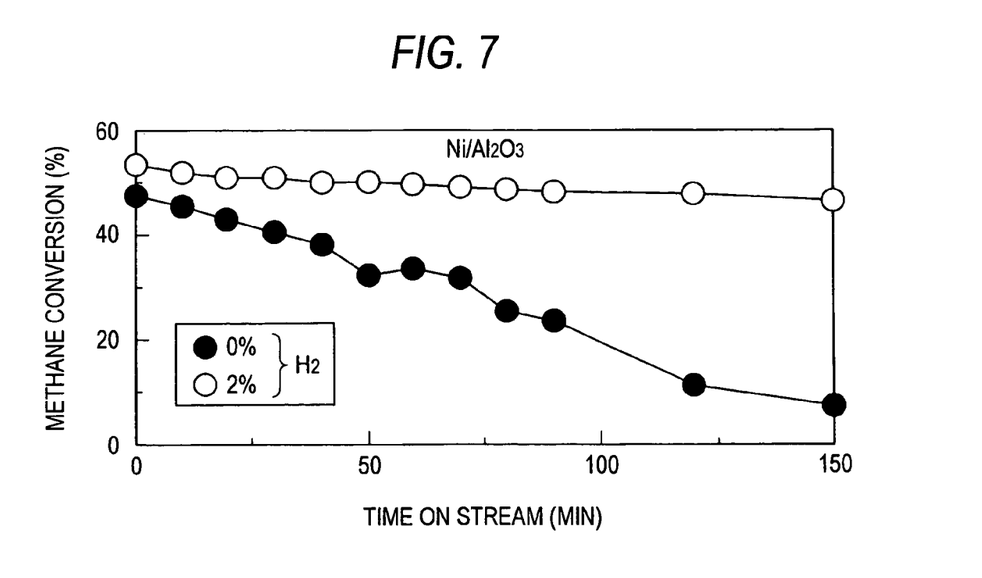
FIG. 7 is a graph illustrating the change of conversion with time on stream developed when the reaction is effected in the presence of a nickel catalyst with no or 2% of $H_2$ being present as a coexistent gas.

Using a reactor shown in FIG. 1, a methane decomposition reaction was effected at a reaction temperature of 700° C., an Ni (10 wt %)/$Al_2O_3$ catalyst weight of 0.5 g and a methane flow rate of 100 ml/min. The concentration of $H_2$ was kept at 2% from the beginning of the reaction. The results are shown in FIG. 7. The maintenance of methane conversion was remarkably enhanced as compared with the case where the concentration of $H_2$ was 0%. This is presumably attributed to the fact that the excess precursor of functional nanocarbon and amorphous carbon on the surface of the catalyst react selectively with hydrogen so that they are gasified away. On the other hand, it was confirmed that in the case where the Ni (10 wt %)/$Al_2O_3$ catalyst is used in the methane decomposition reaction without undergoing hydrogen reduction, when methane contains hydrogen in a proportion of 20%, the decomposition of methane is remarkably inhibited. This is presumably attributed to the fact that the methane decomposition reaction causes the production of hydrogen as much as twice methane by mol, inhibiting chemical equilibrium. This is attributed also to the fact that $CH_x$ species on the surface of the catalyst reacts away with hydrogen before being converted to functional nanocarbon.

What is claimed is:

1. A method for producing a nanocarbon and hydrogen comprising:
    direct decomposing a lower hydrocarbon by using a catalyst comprising a metal carried on a support with subjecting coexistent gas to the lower hydrocarbon to thereby produce the nanocarbon and hydrogen, the coexistent gas comprising low concentration of oxidizing gas, reducing gas or a mixture thereof, wherein the metal content (wt %) of the catalyst is less than that of the support
    wherein the coexistent gas reacts with excess precursor of nanocarbon produced on the catalyst or an amorphous carbon secondarily produced on the catalyst and removes the nanocarbon and the amorphous carbon from the catalyst, and
    wherein the coexistent gas comprises hydrogen, carbon dioxide and water, wherein the hydrogen is present in a volume of from 0.05% to 5.0%, the carbon dioxide is present in a volume of from 0.05% to 10%, and the water is present in a volume of from 0.05% to 5.0% or a mixture thereof.

2. The method for producing a nanocarbon and hydrogen according to claim 1, wherein the lower hydrocarbon comprises methane.

3. The method for producing a nanocarbon and hydrogen according to claim 1, wherein the lower hydrocarbon comprises methane in biogas.

4. The method for producing a nanocarbon and hydrogen according to claim 1, wherein the coexistent gas consists essentially of carbon dioxide in biogas.

5. The method for producing a nanocarbon and hydrogen according to claim 1, wherein the coexistent gas consists essentially of water in biogas.

6. The method for producing a nanocarbon and hydrogen according to claim 1, wherein the coexistent gas comprises hydrogen produced by the direct decomposing the lower hydrocarbon.

7. The method for producing a nanocarbon and hydrogen according to claim 1, wherein the catalyst comprises nickel and iron.

8. The method for producing a nanocarbon according to claim 7, wherein the catalyst further comprises another metal comprising at least one of palladium and cobalt.

9. The method for producing a nanocarbon and hydrogen according to claim 1, wherein the direct decomposing the lower hydrocarbon is carried out in a temperature of from 600° C. to 850° C. and a pressure of 1 MPa or less.

10. The method for producing a nanocarbon and hydrogen according to claim 1, wherein the catalyst support comprises $Al_2O_3$.

11. A method for producing a nanocarbon and hydrogen comprising:
    direct decomposing a lower hydrocarbon by using a catalyst comprising a metal carried on a support with subjecting coexistent gas to the lower hydrocarbon to thereby produce the nanocarbon and hydrogen, the coexistent gas comprising low concentration of oxidizing gas, reducing gas or a mixture thereof, wherein the metal content (wt %) of the catalyst is less than that of the support
    wherein the coexistent gas reacts with excess precursor of nanocarbon produced on the catalyst or an amorphous carbon secondarily produced on the catalyst and removes the nanocarbon and the amorphous carbon from the catalyst, and
    wherein the coexistent gas comprises hydrogen, carbon dioxide and water, wherein the hydrogen and carbon dioxide are present in a total amount of 0.05% to 3% in volume and the water is present in a volume of from 0.5% to 5.0%.

* * * * *